United States Patent
Kieselbach et al.

(10) Patent No.: US 8,056,010 B2
(45) Date of Patent: Nov. 8, 2011

(54) METHOD AND SYSTEM FOR REMOVING RECIPIENTS FROM A MESSAGE THREAD

(75) Inventors: Oliver Kieselbach, Bielefeld (DE); Niklas Heidloff, Salzkotten (DE); Gregory R. Klouda, Lancaster, MA (US); Michael R. O'Brien, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 11/754,228

(22) Filed: May 25, 2007

(65) Prior Publication Data

US 2008/0295000 A1    Nov. 27, 2008

(51) Int. Cl.
   *G06F 3/00*    (2006.01)
(52) U.S. Cl. .................................. 715/752; 715/810
(58) Field of Classification Search .............. 715/752, 715/810
   See application file for complete search history.

(56) References Cited

U.S. PATENT DOCUMENTS

| | | | |
|---|---|---|---|
| 5,990,886 A * | 11/1999 | Serdy et al. ................ | 715/752 |
| 6,480,885 B1 * | 11/2002 | Olivier ....................... | 709/207 |
| 6,721,785 B1 | 4/2004 | Raghunandan | |
| 6,785,681 B2 | 8/2004 | Keskar et al. | |
| 6,963,910 B1 | 11/2005 | Belknap et al. | |
| 6,968,179 B1 * | 11/2005 | De Vries ..................... | 455/414.1 |
| 7,552,185 B1 * | 6/2009 | Kirzner et al. ............... | 709/206 |
| 2002/0026480 A1 * | 2/2002 | Terada ........................ | 709/206 |
| 2002/0107930 A1 | 8/2002 | Itoh | |
| 2003/0028524 A1 | 2/2003 | Keskar et al. | |
| 2004/0093382 A1 | 5/2004 | Kulkarni | |
| 2005/0108402 A1 | 5/2005 | Colson et al. | |
| 2005/0117715 A1 * | 6/2005 | Bordia ........................ | 379/88.13 |
| 2005/0198144 A1 * | 9/2005 | Kraenzel et al. ............. | 709/206 |
| 2006/0030340 A1 * | 2/2006 | Lin et al. ..................... | 455/457 |
| 2006/0165289 A1 * | 7/2006 | Boss et al. ................... | 382/182 |
| 2007/0050456 A1 * | 3/2007 | Vuong et al. ................. | 709/206 |
| 2007/0130526 A1 * | 6/2007 | Allwright et al. ............ | 715/752 |
| 2007/0255789 A1 * | 11/2007 | Buchheit ...................... | 709/206 |
| 2008/0005685 A1 * | 1/2008 | Drews et al. ................. | 715/764 |
| 2008/0098071 A1 * | 4/2008 | Jones et al. .................. | 709/206 |
| 2008/0133669 A1 * | 6/2008 | Ge et al. ...................... | 709/206 |
| 2008/0168360 A1 * | 7/2008 | Wilson ........................ | 715/752 |
| 2008/0183822 A1 * | 7/2008 | Cai et al. ..................... | 709/206 |
| 2008/0189622 A1 * | 8/2008 | Sanchez et al. .............. | 715/752 |
| 2008/0301250 A1 * | 12/2008 | Hardy et al. ................. | 709/207 |
| 2009/0043862 A1 * | 2/2009 | Bordia ......................... | 709/206 |
| 2009/0300546 A1 * | 12/2009 | Kwok et al. ................. | 715/825 |

* cited by examiner

*Primary Examiner* — Ryan Pitaro
(74) *Attorney, Agent, or Firm* — David A. Dagg (57) ABSTRACT

A system for conveniently removing recipients from a message being added to a message thread that enables a user to filter people from a recipient list of a message being added to a message thread. The system advantageously enables a user to filter out potential recipients based on a) their previous non-participation in the thread, b) their lack of registered interest in a topic of the thread, and/or c) their being listed only as recipients by way of their being contained in a group indicated in the recipient list.

14 Claims, 5 Drawing Sheets

METHOD AND SYSTEM FOR REMOVING RECIPIENTS FROM A MESSAGE THREAD

FIELD OF THE INVENTION

This present invention relates generally to messaging systems, such as electronic mail, and more specifically to a method and system for conveniently removing recipients from a message thread.

BACKGROUND OF THE INVENTION

As it is generally known, in computer-based communications, electronic mail ("e-mail") is an example of contemporary asynchronous messaging systems. Messaging systems such as e-mail enable geographically dispersed users to exchange information over a communication network. Asynchronous messaging systems such as e-mail allow messages to be exchanged regardless of whether the message sender and recipient(s) are simultaneously on-line or logged in. E-mail messages are typically conveyed using what is referred to as a "store and forward" protocol, in which messages are initially transmitted from a sender's client computer system, and then stored on at least one server computer system, from which they are eventually retrieved for viewing on one or more recipients' client computer systems. E-mail messages are often exchanged using the Simple Mail Transfer Protocol (SMTP), and users download messages from servers with standard protocols such as POP (Post Office Protocol) or IMAP (Internet Message Access Protocol), or using proprietary protocols.

E-mail messages are typically stored in and represented to the user in what are generally referred to as message "mailboxes". For example, a mailbox is used to store received e-mail messages in some existing systems, referred to as the user's "Inbox".

A series of messages that have been posted as replies to each are often referred to as a message "thread". By reading each message in a thread, a user can learn how a discussion conveyed by the thread evolved.

Users of existing e-mail systems often face the problem of having too many e-mail messages contained in their Inbox. This problem arises for several reasons. One reason is that messages in threads are often sent to an overly broad recipient list. Thread participants usually use a REPLY TO ALL function or the like when adding a message to the thread, causing their reply to be sent to all recipients of the previous message, without making an effort to selectively filter out unwanted and/or un-needed recipients. This kind of user behavior is mainly the result of current e-mail system user interface design, which doesn't adequately support recipient filtering in a convenient way. As a result, messages in threads are distributed to users who may no longer be interested in the discussion represented by the thread. Such uninterested users continue to be treated as recipients even though they will not participate in the discussion for the thread. For example, replies are often sent to users included in an original distribution list because they are members of a group indicated in the distribution list, even though those users have no interest in the specific topic of the thread.

Moreover, the subject of an e-mail thread often evolves and changes during the lifetime of the thread. Users that may have been initially interested in a thread may at some point lose interest after the subject of the thread changes. For example, a thread including messages at a more general level of discussion may become uninteresting to certain initially interested users after the thread goes down a more detailed, technical line of discussion. This may result in such general interest users losing interest in subsequent thread messages, and not participating further in the thread.

Existing systems have not effectively recognized or dealt with this problem. The user interface designs of existing e-mail systems do not conveniently assist users wishing to filter recipients for a message in a message thread. For example, if a user group is indicated in a recipient list, existing systems do not effectively allow a user to filter recipients from within the group. In addition, the problem may be compounded by the fact that users are often biased towards sending replies to a relatively large recipient set, out of fear that interested people might otherwise be left out.

Thus it would be desirable to have a new system for adding messages to message threads that enables a sending user to more effectively filter message recipients.

SUMMARY OF THE INVENTION

In order to address the above described and other shortcomings of previous approaches, a method and system are disclosed for conveniently removing recipients from a message being added to a message thread. In the disclosed system, features are provided that enable a user to filter people from a recipient list of a message being added to a message thread. The features of the disclosed system enable a user to filter potential recipients based on a) their previous participation in the thread, b) their registered interest in a topic of the thread, and/or c) whether they are part of a user group contained in the recipient list, as opposed to being indicated individually in the recipient list. The disclosed system provides features that enable users to remove all group indicators, all non-participating recipients, and/or all un-interested recipients from an initial recipient list.

In one embodiment, user interface options are provided such as action buttons or other user interface constructs or objects within an e-mail application user interface for reading a received message and/or for composing a message that is a reply to a previously received message. Such options may, for example, be provided as alternatives to or in response to user selection of a REPLY TO ALL option. User interface options provided through corresponding user interface display objects allow a user to remove all groups from the message recipient list. This is advantageous in that it allows continuation of a discussion represented by a thread on an individual user basis. User options provided through such user interface objects further allow a user to filter users in a recipient list that have previously not participated in the thread, e.g. have not posted at least one message to the thread. The determination by the disclosed system of whether a user has participated in a thread may be based on whether that user has posted a message to the thread at any time, whether that user has posted a message to the thread within a certain time period, whether that user has posted a message to the thread within a certain number of previous messages entered to the thread, or on some other criteria of thread participation.

User interface options provided through the user interface objects of an embodiment of the disclosed system further allow the user to select from initially listed message recipients that do not have an interest associated with the topic of the thread to which a message is to be added. If a non-interested recipient is not selected by the user as a recipient, then they are removed from the initial recipient list, and the message will not be sent to them. To determine whether a recipient has an interest in a given thread topic, the disclosed system may refer to a database of self-registered or automatically determined interests associated with individual users. For example, an interest profile may be stored for each user indicating topics they have expressly registered an interest in, and/or topics in which they have automatically been determined to have an interest in. Such automatically determined interests may, for example, be based on analysis of previously exchanged e-mail message traffic content or the like to determine a set of topics that are most interesting to each user, e.g. based on frequency of topics being discussed by that user.

Thus there is disclosed a system for assisting users of a messaging system in filtering recipients for a message to be added to a thread. The disclosed system conveniently allows a user to filter out recipients based on their only being indicated in the recipient list as part of a group, their lack of previous participation in the thread, and/or their lack of interest in a topic of the thread. As a result, the sending user can more effectively filter recipients for a message that is part of a message thread.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
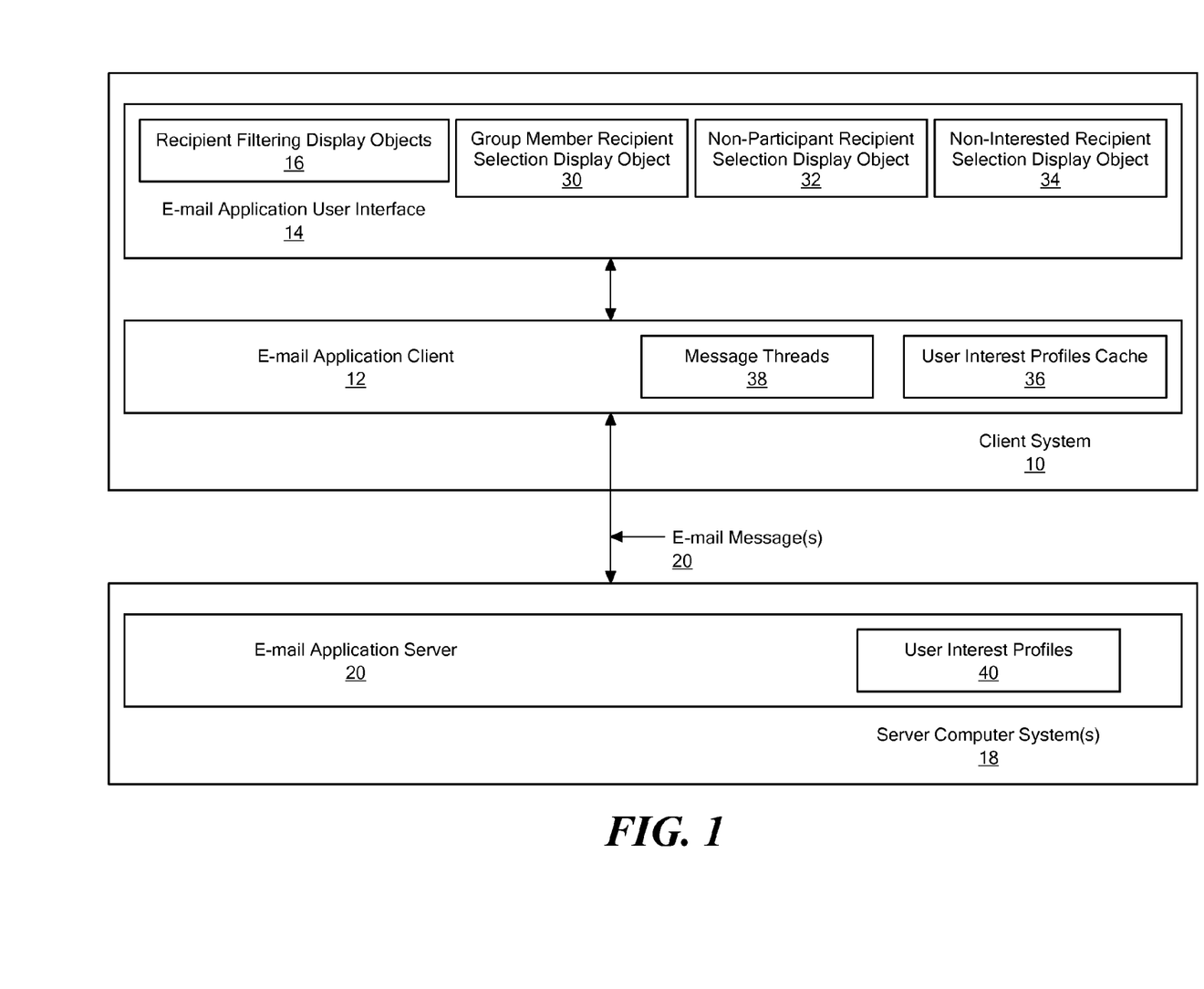
FIG. 1 is a block diagram showing hardware and/or software components in an illustrative embodiment of the disclosed system.

As shown in FIG. 1, an illustrative embodiment of the disclosed system includes an e-mail application client 12 on a client system 10. For example, the e-mail application client 12 may be made up of application program code executing on a client computer system 10. Alternatively, the e-mail application client 12 may be embodied as another type of messaging program code, firmware, and/or hardware logic. The client system 10 may be embodied as any specific type of electronic device capable of providing messaging capabilities to an end user, such as a desktop computer system, hand-held device, portable computer system, personal data assistant (PDA), cell phone, etc.

Further with reference to FIG. 1, the e-mail application client 12 generates an e-mail application user interface 14 to a local user of the client system 10. The e-mail application user interface 14 is shown including recipient filtering display objects 16, group member recipient selection display object 30, non-participant recipient selection display object 32, and non-interested recipient selection display object 34. The e-mail application user interface 14 is, for example, at least part of a graphical user interface (GUI) provided to a local user of the client system 12 through a display device such as an LCD (Liquid Crystal Display), CRT (Cathode Ray Tube), or the like. The display objects 16, 30, 32 and 34 may each be made up of any specific type of GUI display object or objects, such as menus, buttons, dialog boxes, etc.

The e-mail application client 12 provides messaging functions related to sending and receiving e-mail messages, and further provides user access to messages stored in a number of mailbox structures, such as Inbox, Sent Items, Outbox, and/or others. The messages in such mailbox structures may include messages organized into a number of message threads, shown for purposes of illustration by message threads 38.

The e-mail application client 12 may further include or provide access to a number of user interest profiles, reflecting the self-registered or automatically determined interests of users of the messaging system provided through the e-mail application client 12. For example, users may be allowed to register or otherwise expressly indicate their interest in certain topics or subjects, and these user-registered interests may be stored in user interest profiles corresponding to each user. Alternatively, or in addition, user interests may be automatically determined for individual users, for example based on the frequency with which a user sends and/or receives messages related to specific topics. A copy of resulting user interest profiles may be stored locally on the client system 10, as shown by the user interest profile cache 36 in FIG. 1. The user interest profiles may be stored centrally on one or more server computer systems, shown for purposes of illustration in FIG. 1 by the user interest profiles 40 stored in the e-mail application server 20 on the server computer system 18. In an embodiment that allows for user registration of topic interests, a user might, for example, register an interest in the topic "Linux", and that registered interest would be registered in the user interest profiles 40, and potentially also in the user interest profiles cache 36. The disclosed system may be embodied with or without the user interest profiles cache 36, as further explained below.

During operation of the embodiment shown in FIG. 1, the recipient filtering display objects 16 enable a local user of the client system 10 to conveniently filter out recipients in an initial recipient list for an e-mail message that fall within the following categories: 1) recipients that are specified in the initial recipient list only within one or more recipient user groups (as opposed to being individually specified as recipients), 2) recipients that have not participated in a message thread to which the message is to be added (e.g. have not posted a message contained in the thread), and/or 3) recipients that do not have an interest in a topic of the message thread to which the message is to be added (e.g. do not have an interest in the topic of the thread stored in their user interest profile). The disclosed system may be embodied such that one or more recipient selection display objects are provided allowing a local user to individually select recipients from the preceding categories to be included in a modified recipient list.

Filtering of recipients based on user inputs received through the recipient filtering display objects 16, group member recipient selection display object 30, non-participant recipient selection display object 32 and/or non-interested recipient selection display object 34 may be performed on the client system 10 by the e-mail application client 12 and/or on the server computer system(s) 18 by the e-mail application server 20. For example, in an embodiment that supports filtering performed at the server computer system(s) 18, the e-mail message(s) 20 include flags representing filtering options selected by the local user of the client system 20 through the e-mail application user interface 14. Such flags may, for example, be contained within one or more MIME (Multipurpose Internet Mail Extensions) headers representing user selected recipient filtering options. In such an embodiment, recipient filtering based on user interests may be performed using information stored in the user interest profiles 40, without requiring the user interest profiles cache 36. Such an embodiment would further allow recipient filtering to be performed by a message transfer agent (MTA) executing on the server computer system(s) 18. Such an embodiment may be advantageous in that user interest based filtering could be performed in an off-line mode of operation. This embodiment may potentially also result in a local user not having access to the actual, modified recipient list before he/she sends a message.

The client system 10 and server computer system 18 of FIG. 1 are communicably connected, for example by way of a communication network such as the Internet, a Local Area Network (LAN), or other specific type of communication network. The e-mail application client 12 and e-mail application server 20 may, for example, operate using a client-server approach to provide portions of the application user interface 14. Alternatively, e-mail application client 12 may include Web browser program functionality operable to request and receive Web page content, including HTML (Hypertext Markup Language) code or the like, and to render such Web page content on a display device for the local user of the client system 10.

The client system 10 and server computer system(s) 18 may each include at least one processor, program storage, such as memory, for storing program code executable on the processor, and one or more input/output devices and/or interfaces, such as data communication and/or peripheral devices and/or interfaces. The client system 10 and server computer system(s) 18 may further include appropriate operating system software.

Figure 2:
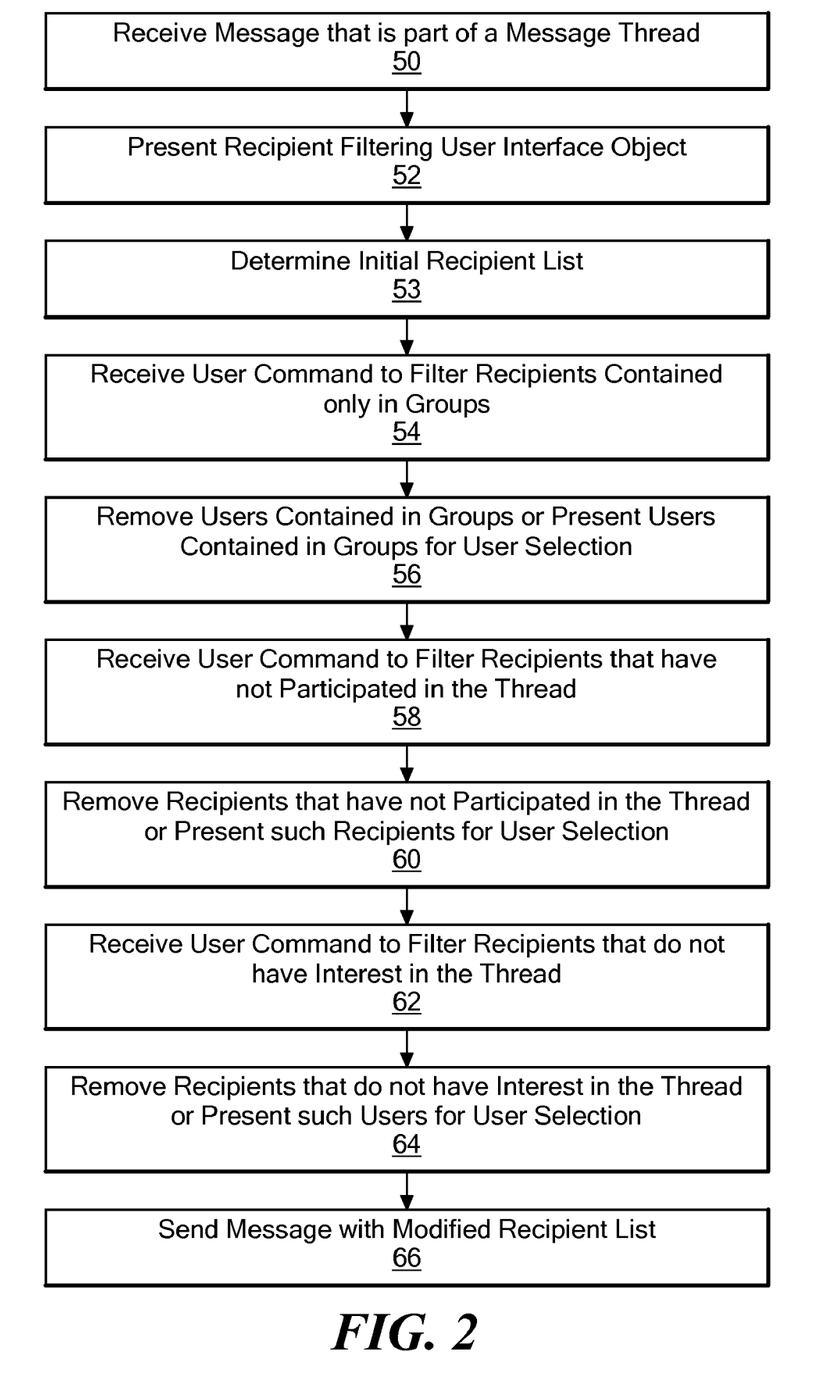
FIG. 2 is a flow chart showing steps performed during operation of an illustrative embodiment of the disclosed system.

FIG. 2 is a flow chart showing steps performed during operation of an illustrative embodiment of the disclosed system. At step 50, a message is received that is part of a message thread. For example, an e-mail message may be received by the client system 10 shown in FIG. 1. At step 52, the disclosed system presents one or more recipient filtering user interface objects, such as the recipient filtering display objects 16 of FIG. 1.

At step 53, the disclosed system determines an initial recipient list. For example, the initial recipient list determined at step 53 may be made up of all other recipients of the message received at step 50, as well as the user that sent the message received at step 50. Such an initial recipient list may, for example, result when a user selects a REPLY ALL function or the like in the e-mail application user interface 14. Alternatively, the initial recipient list may be made up of a list of recipients entered, selected or otherwise indicated by the local user when composing a new message. The initial recipient list may include indications (e.g. e-mail addresses) of individual recipients, as well as indications of recipient groups (e.g. user group names).

At step 54, the disclosed system receives a user command to filter recipients from the initial recipient list that are contained only within user groups indicated in the initial recipient list determined at step 53. A user is considered to be only contained within user groups if there is no individual e-mail address for that user in the initial recipient list, and that user is contained in one or more user groups indicated in the initial recipient list.

At step 56 the disclosed system may be embodied to remove all recipients from the initial recipient list that are only contained in user groups (i.e. by removing all group indicators from the initial recipient list). Alternatively, the disclosed system may be embodied to present a recipient selection interface at step 56, such as the group member recipient selection display object 30 of FIG. 1, that enables the local user to select from recipients in the initial recipient list that are only contained in user groups. In such an alternative embodiment, the recipients selected by the user through such a recipient selection interface at step 56 are included in the resulting modified recipient list, while those that are not selected are not included.

At step 58, the disclosed system receives a user command to filter recipients from the initial recipient list that have not participated in the thread to which the message received at step 50 belongs. A user is considered to not have participated in the thread if that user has not posted at least one message to the thread at the time the message is received at step 50. The determination by the disclosed system of whether a user has participated in a thread may be based on whether that user has posted a message to the thread at any time, whether that user has posted a message to the thread within a certain time period, whether that user has posted a message to the thread within a certain number of previous messages entered to the thread, or on some other criteria of thread participation.

At step 60 the disclosed system may be embodied to remove all recipients from the initial recipient list that have not participated in the thread to which the message received at step 50 belongs. Alternatively, the disclosed system may be embodied to present a recipient selection interface at step 60, such as the non-participant recipient selection display object 32 of FIG. 1, that enables the local user to select from recipients in the initial recipient list that are non-participants in the thread to which the message received at step 50 belongs. In such an alternative embodiment, the recipients selected at step 60 are included in the resulting modified recipient list, while those that are not selected are not included.

At step 62, the disclosed system receives a user command to filter recipients from the initial recipient list that do not have an interest in the thread to which the message received at step 50 belongs. A user is considered to not have interest in the thread if that user has not either registered an interest in a topic of the thread, and/or in the case that an interest of the user in the topic of the thread has not been automatically determined based on monitored activities (e.g. previous messaging activities) of the user. For example, user interest in the thread may be determined by examining a dynamically maintained user interest profile stored in the user interest profiles cache 36 or the user interest profiles 40 shown in FIG. 1.

At step 64 the disclosed system may be embodied to remove all recipients from the initial recipient list that do not have an interest in the topic of the thread to which the message received at step 50 belongs. Alternatively, the disclosed system may be embodied to present a recipient selection interface at step 64, such as the non-interested recipient selection display object 34 of FIG. 1, that enables the local user to select from recipients in the initial recipient list that do not have an interest in the thread to which the message received at step 50 belongs. In such an alternative embodiment, the recipients selected at step 64 are included in the resulting modified recipient list, while those that are not selected are not included.

At step 66 the message is transmitted to the recipients indicated in the recipient list as modified in response to user commands and actions in the preceding steps.

Figure 3:
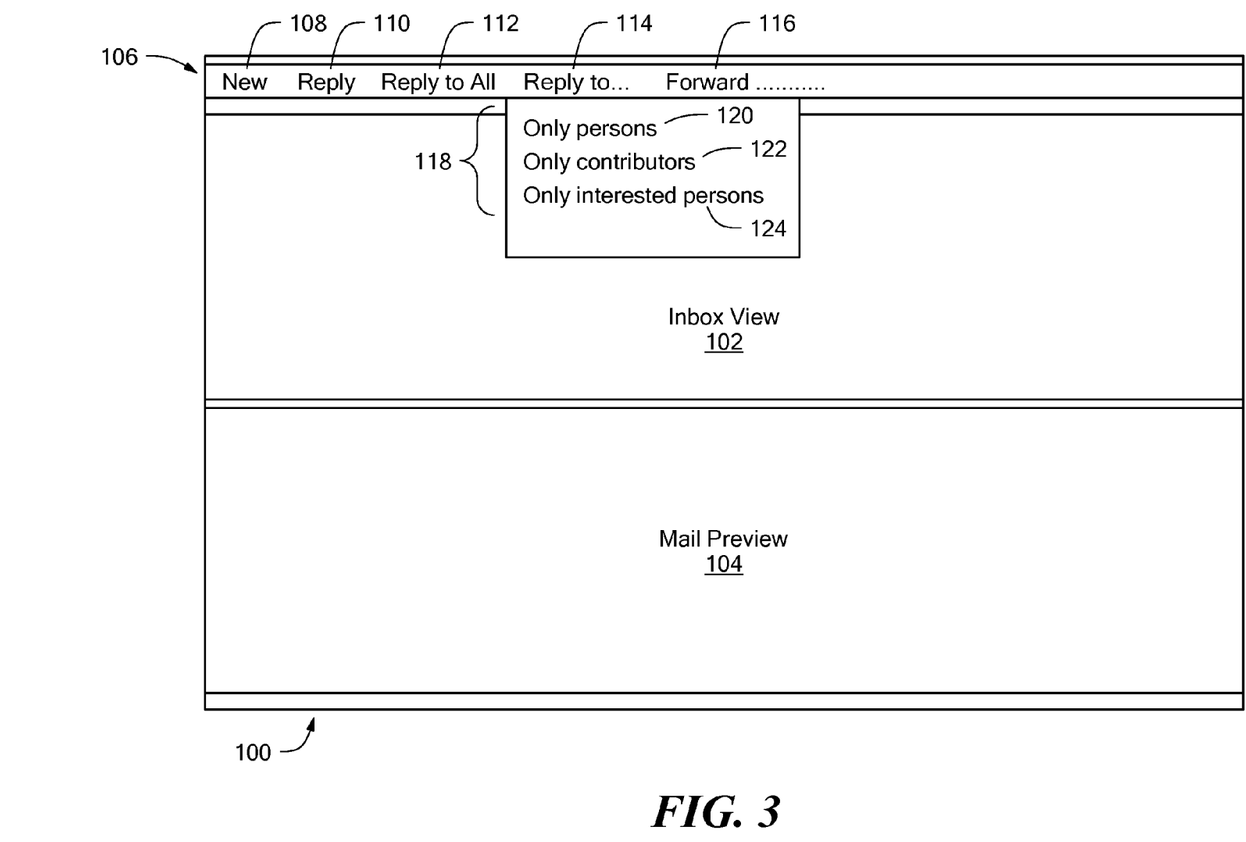
FIG. 3 is a simplified screen shot showing display objects generated during operation of an illustrative embodiment when generating a reply message to be posted to a message thread.

FIG. 3 is a simplified screen shot showing display objects generated during operation of an illustrative embodiment when generating a reply message to be posted to a message thread. As shown in FIG. 3, an e-mail application user interface window 100 includes an Inbox view 102, and a mail message preview 104. For example, the Inbox view 102 may display a listing of messages that have been delivered to the local user. The mail message preview 104 may display the contents of a currently selected message listed in the Inbox view 102. A row 106 of user selectable command buttons includes a New Message button 108, a Reply button 110, a Reply to All button 112, a Reply to button 114, and a Forward button 116. User selection of the new message button 108, for example by clicking on the New Message button 108, causes a new message composition user interface screen to be displayed. User selection of the Reply button 110, for example by clicking on the Reply button 110, causes a reply message composition user interface to be displayed. The TO: recipient field in the reply message composition user interface is pre-loaded with an initial recipient list containing only the sender of the message to which the reply is being generated.

User selection of the Reply to All button 112, for example by clicking on the reply to all button 112, causes a reply message composition user interface to be displayed, having the TO: recipient field pre-loaded with an initial recipient list containing all recipients (both individuals and groups) of the message to which the reply is being generated. The initial recipient list pre-loaded in the TO: recipient field of the reply message composition user interface generated in response to user selection of the Reply to All button 112 further includes the sender of the message to which the reply is being generated. Similarly, the CC: and/or BCC: recipient fields of the reply message composition user interface generated in response to user selection of the Reply to All button 112 include all recipients (both individuals and groups) that were originally contained in the corresponding recipient fields of the message to which the reply is being generated. User selection of the Forward button 116 results in generation of a forward message composition user interface screen for forwarding a currently selected message to a user supplied recipient list.

User selection of the Reply to button 114, for example by the user clicking on the Reply to button 114, results in display of the recipient filtering menu 118, which includes user selectable recipient filtering options 120, 122 and 124. The recipient filtering options 120, 122 and 124 correspond to the recipient filtering display objects 16 shown in FIG. 1. User selection of the Reply to button 114 causes a reply message composition user interface to be displayed, but allows the user to select from the recipient filtering options 120, 122 and 124 to filter out recipients from an initial recipient list or lists contained in one or more recipient fields of the resulting reply message composition user interface.

For example, the initial recipient list of the TO: recipient field for the reply message composition user interface generated in response to the user clicking on the Reply to button 114 would include all recipients (both individuals and groups) listed in the TO: field of the message to which the reply is being generated (e.g. the currently selected message in the Inbox view 102), as well as the sender of that message. The initial recipient list of the CC: recipient field for the reply message composition user interface generated in response to the user clicking on the Reply to button 114 would initially include all recipients (both individuals and groups) listed in the CC: field of the message to which the reply is being generated. Similarly, the initial recipient list of the BCC: recipient field for the reply message composition user interface generated in response to the user clicking on the Reply to button 114 would initially include all recipients (both individuals and groups) listed in the BCC: field of the message to which the reply is being generated.

User selection of the "Only persons" filtering option 120, for example by the user clicking on the "Only persons" filtering option 120, results in the above described initial recipient lists being filtered such that any recipients that are only present in those initial recipient lists as members of user groups are removed. Thus, the result of the user clicking on the "Only persons" filtering option 120 is that all groups are removed from the above described initial recipient lists.

User selection of the "Only contributors" filtering option 122, for example by the user clicking on the "Only contributors" filtering option 122, results in the above described initial recipient lists being filtered such that any recipients that have not contributed at least one message to the message thread to which the message being replied to belongs are removed. Thus, the result of the user clicking on the "Only contributors" filtering option 122 is that all non-participants are removed from the above described initial recipient lists.

User selection of the "Only interested persons" filtering option 124, for example by the user clicking on the "Only interested persons" filtering option 124, results in the above described initial recipient lists being filtered such that any recipients that do not have an interest in the topic of the thread to which the message being replied to belongs are removed. Thus, the result of the user clicking on the "Only interested persons" filtering option 124 is that all non-interested persons are removed from the above described initial recipient lists.

Figure 4:
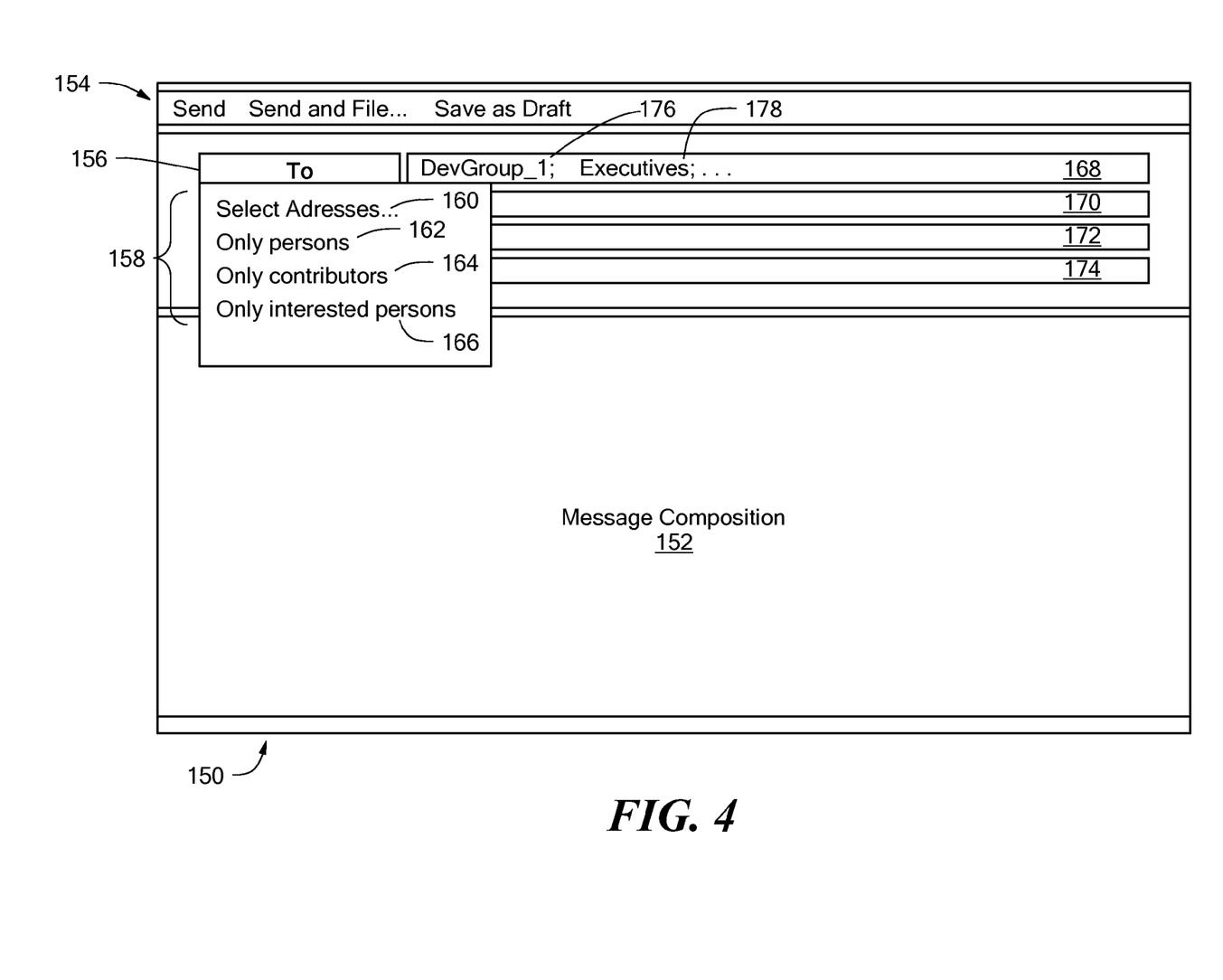
FIG. 4 is a simplified screen shot showing display objects generated during operation of an illustrative embodiment when composing a reply message.

FIG. 4 is a simplified screen shot showing display objects generated during operation of an illustrative embodiment when composing a message. As shown in FIG. 4, a message composition user interface screen 150 includes a message composition window 152, and a number of command buttons 154. The message composition user interface screen 150 further includes a TO: recipient field 168, a CC: recipient field 170, a BCC: recipient field 172, and a Topic: field 174. As further shown in FIG. 4, if a user clicks on the TO: button 156, a number of user selectable recipient filtering options 158 are displayed. The TO: recipient field 168 is shown pre-loaded with an initial recipient list including two user group indicators: "DevGroup_1" 176 and "Executives" 178. Such an initial recipient list may, for example, result if the message composition user interface screen 150 is generated as a result of the user clicking on the Reply to All button 112 shown in FIG. 3, and the currently selected, previously received message in the Inbox view 102 was originally sent to a set of recipients including the two user groups 176 and 178. Alternatively, such an initial recipient list may result if the message composition user interface screen 150 is generated as a result of the user clicking on the New Message button 108 in FIG. 3, and then manually enters the two user groups 176 and 178.

When the user clicks on the "Select Addresses" option 160, the user's electronic address book is displayed to enable the user to select addresses from their address book to be included in recipient list in the TO: recipient field 168. When the user clicks on the "Only persons" filtering option 162, the disclosed system operates to remove all groups from the recipient list in the TO: recipient field 168. Similarly, when the user clicks on the "Only contributors" filtering option 164, the disclosed system operates to remove all recipients from the recipient list in the TO: recipient field 168 that have not contributed at least one message to a message thread to which the message being composed is a reply. Also, when the user clicks on the "Only interested persons" filtering option 166, the disclosed system operates to remove all recipients from the recipient list in the TO: recipient field 168 that do not have an interest in the topic of the message thread to which the message being composed is a reply.

While filtering options 158 are shown for purposes of illustration in FIG. 4 with regard to the contents of the TO: recipient field 168, similar options may also be provided for filtering the contents of the CC: recipient field 170 and the contents of the BCC: recipient field 172.

Figure 5:
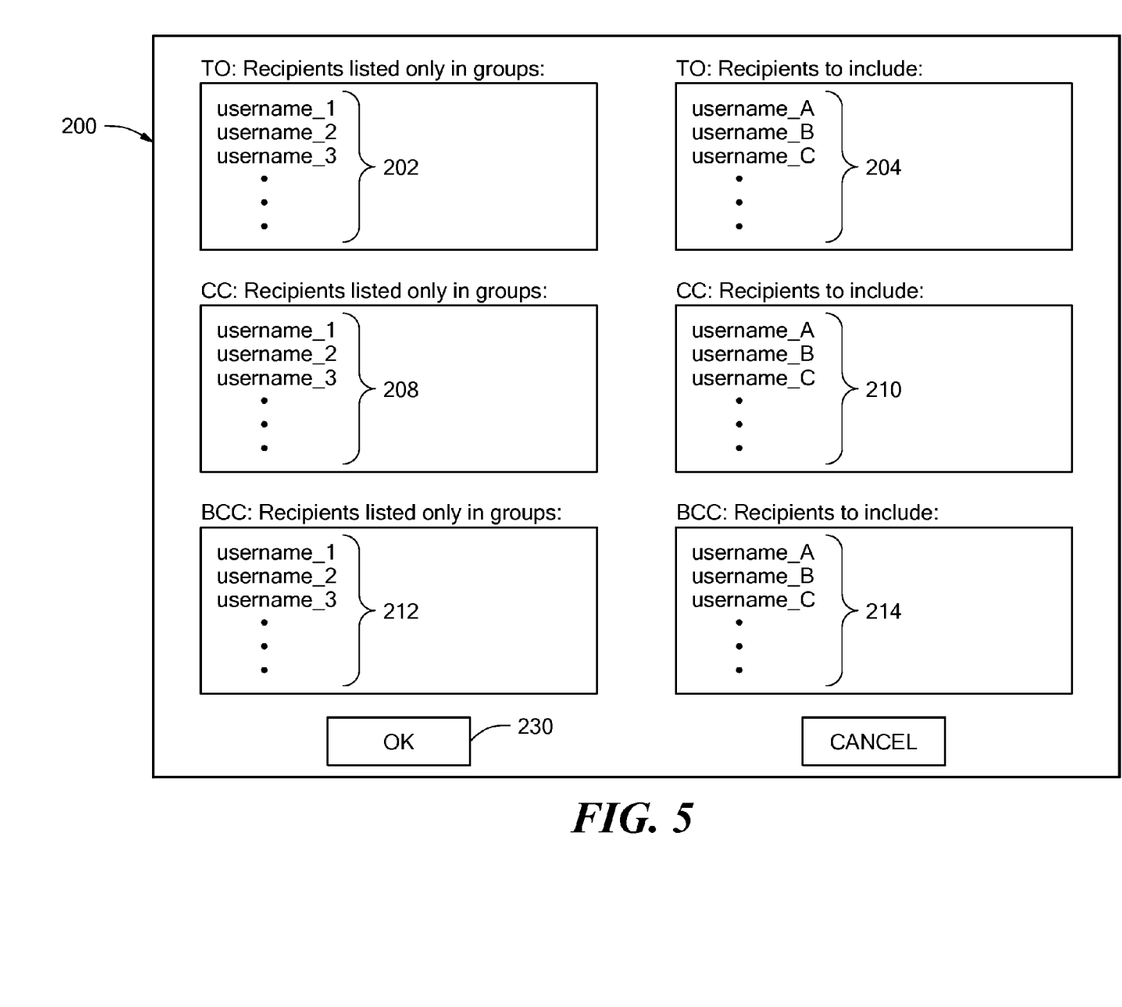
FIG. 5 is a simplified screen shot showing a display object generated during selection of recipients based on group membership.

FIG. 5 is a simplified screen shot showing a recipient selection display object 200 generated by an embodiment of the disclosed system to enable a user to select from recipients contained in groups indicated in a recipient list. In the embodiment of FIG. 5, when the user selects a filtering option that removes groups from a recipient list (e.g. filtering option 162 of FIG. 4 or filtering option 120 of FIG. 3), the user is presented with a recipient selection interface such as the display object 200 that enables the user to select recipients contained in the group or groups being removed but that should still be individually listed in the recipient list after the group or groups have been removed. For example, as shown in FIG. 5, a list 202 displays all recipients that are contained only in groups in the initial recipient list of the TO: field, and would accordingly be removed from the TO: field when all groups are removed. If the user sees any recipients in the list 202 that they want to still be included in the TO: field recipient list after the groups have been removed, they can move those desired recipients (e.g. by dragging and dropping using a mouse) into the list 204. Similarly, the list 208 displays all recipients that are contained only groups in the initial recipient list of the CC: field, and would accordingly be removed from the CC: field when all groups are removed. If the user sees any recipients in the list 208 that they want to still be individually included in the CC: field recipient list after the groups have been removed, then the user can move those desired recipients (e.g. by dragging and dropping using a mouse) into the list 210. Also, a list 212 displays all recipients that are contained only in groups in the initial recipient list of the BCC: field, and would accordingly be removed from the BCC: field when all groups are removed. If the user sees any recipients in the list 212 that they want to still be individually included in the BCC: field recipient list after all groups have been removed, then the user can move those desired recipients (e.g. by dragging and dropping using a mouse) into the list 214. When the user clicks on the OK button 230, all groups listed in the recipient lists for the TO:, CC: and BCC: fields are removed, but the recipients in lists 204, 210 and 214 are individually included in the respective recipient fields.

While the recipient selection display object 200 of FIG. 5 is used to allow a user to select from recipients that are only listed in groups within an initial recipient list, the same display object layout and operation can be used to provide recipient selection display objects allowing a user to select from recipients that are not contributors to a thread to which a reply is being posted, or allowing a user to select from recipients that are not interested in the topic of such a thread. For example, in a recipient selection display object allowing a user to select from recipients that are not contributors to a thread to which a reply is being generated, the lists 202, 208 and 212 would contain recipients in the initial recipient lists that have not contributed to the message thread to which the reply is being generated. Those recipients the user wishes to individually maintain in the respective recipient fields can be moved to the lists 204, 210 and 214. Similarly, a recipient selection display object allowing a user to select from recipients that are not interested in the topic of a thread to which a reply is being generated would provide lists 202, 208 and 212 containing recipients in the initial recipient lists that are not interested in the topic of the thread. Again, those recipients the user wishes to maintain in the respective recipient fields can be individually moved to the lists 204, 210 and 212.

While the above description regarding illustrative embodiments of the disclosed system includes examples of specific user interface display objects, such as graphical buttons, menus, dialog boxes, and the like, the present invention is not limited to those specific examples. Accordingly, those skilled in the art will recognize that alternative embodiments may use any specific type or kind of user interface display object that may be appropriate.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for enabling a user to indicate recipients for a message, comprising:

determining an initial recipient list for said message; and generating a first recipient filtering user interface object through which said user can issue a first recipient filtering command that filters recipients for said message from said initial recipient list based on whether each recipient is a member of at least one user group contained in said initial recipient list by removing all group indicators from said initial recipient list, displaying a list of users that are members of user groups corresponding to said removed group indicators and not individually contained in said initial recipient list, and enabling said user to individually select recipients for said message from said list of users that are members of user groups corresponding to said removed group indicators and not individually contained in said initial recipient list.

2. The method of claim 1, further comprising:
generating a second recipient filtering user interface object through which said user can issue a second recipient filtering command that filters recipients for said message from said initial recipient list based on whether each recipient has previously contributed at least one message to a message thread.

3. The method of claim 2, wherein said second recipient filtering command that filters recipients for said message from said initial recipient list based on whether each recipient has contributed to said message thread removes all recipients from said initial recipient list that have not contributed at least one message to said message thread.

4. The method of claim 2, wherein said second recipient filtering command displays a list of all recipients from said initial recipient list that have contributed at least one message to said message thread and enables said user to individually select recipients for said message from said list of all recipients from said initial recipient list that have contributed at least one message to said message thread.

5. The method of claim 2, wherein said initial recipient list is determined from a list of recipients for a previously received message in said message thread, and wherein said message is a reply to said previously received message.

6. The method of claim 1, further comprising:
generating a third recipient filtering user interface object through which said user can issue a third recipient filtering user command that filters recipients for said message from said initial recipient list based on whether each recipient has an interest in a topic of a message thread.

7. The method of claim 6, wherein said third recipient filtering user command filters recipients for said message from said initial recipient list based on whether each recipient has an interest in said topic of said message thread by removing all recipients from said initial recipient list that do not have an interest in said topic of said message thread.

8. The method of claim 6, wherein said third recipient filtering user command displays a list of recipients for said message from said initial recipient list that have an interest in said topic of said message thread and enables said user to individually select recipients for said message from said list of all recipients from said initial recipient list that have an interest in said topic of said message thread.

9. The method of claim 6, wherein said initial recipient list is determined from a list of recipients for a previously received message in said message thread, and wherein said message is a reply to said previously received message.

10. The method of claim 6, wherein interest of a given recipient in said topic is determined from a personal interest profile associated with said given recipient, and wherein interests in said personal interest profile associated with said given recipient are registered by said given recipient.

11. The method of claim 6, wherein interest of a given recipient in said topic is determined from a personal interest profile associated with said given recipient, and wherein interests in said personal interest profile associated with said given recipient are automatically determined based on actions performed by said given recipient.

12. The method of claim 1, wherein said initial recipient list is determined from a list of recipients for a previously received message, and wherein said message is a reply to said previously received message.

13. A computer system comprising:
at least one memory and at least one processor, said memory having program code stored thereon for, when executed one said processor, enabling a user to indicate recipients for a message by causing said computer system to
determine an initial recipient list for said message, and
generate a recipient filtering user interface object through which a user can issue a recipient filtering command that filters recipients for said message from said initial recipient list based on whether each recipient is a member of at least one user group contained in said initial recipient list by removing all group indicators from said initial recipient list, displaying a list of users that are members of user groups corresponding to said removed group indicators and not individually contained in said initial recipient list, and enabling said user to individually select recipients for said message from said list of users that are members of user groups corresponding to said removed group indicators and not individually contained in said initial recipient list.

14. A computer program product comprising:
a non-transient computer readable storage medium, said computer readable storage medium having program code stored thereon for enabling a user to indicate recipients for a message, said program code operable when executed by at least one processor in a computer system to cause said computer system to
determine an initial recipient list for said message, and
generate a recipient filtering user interface object through which a user can issue a recipient filtering command that filters recipients for said message from said initial recipient list based on whether each recipient is a member of at least one user group contained in said initial recipient list by removing all group indicators from said initial recipient list, displaying a list of users that are members of user groups corresponding to said removed group indicators and not individually contained in said initial recipient list, and enabling said user to individually select recipients for said message from said list of users that are members of user groups corresponding to said removed group indicators and not individually contained in said initial recipient list.

* * * * *